D. A. KENNEDY.
Plow-Clevis.

No. 200,730. Patented Feb. 26, 1878.

WITNESSES:

INVENTOR:
D. A. Kennedy
BY
ATTORNEYS.

UNITED STATES PATENT OFFICE.

DONALD A. KENNEDY, OF EAU CLAIRE, WISCONSIN.

IMPROVEMENT IN PLOW-CLEVISES.

Specification forming part of Letters Patent No. 200,730, dated February 26, 1878; application filed January 25, 1878.

*To all whom it may concern:*

Figure 1:
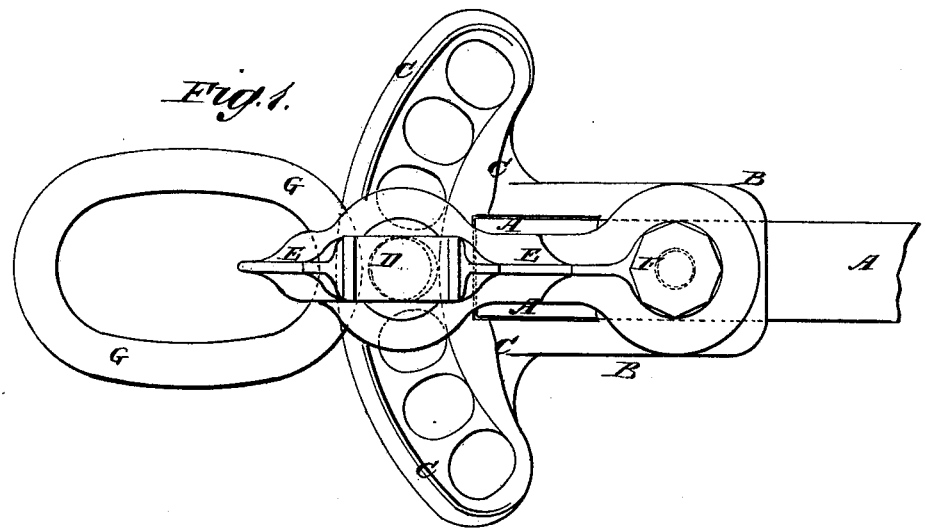
Figure 2:
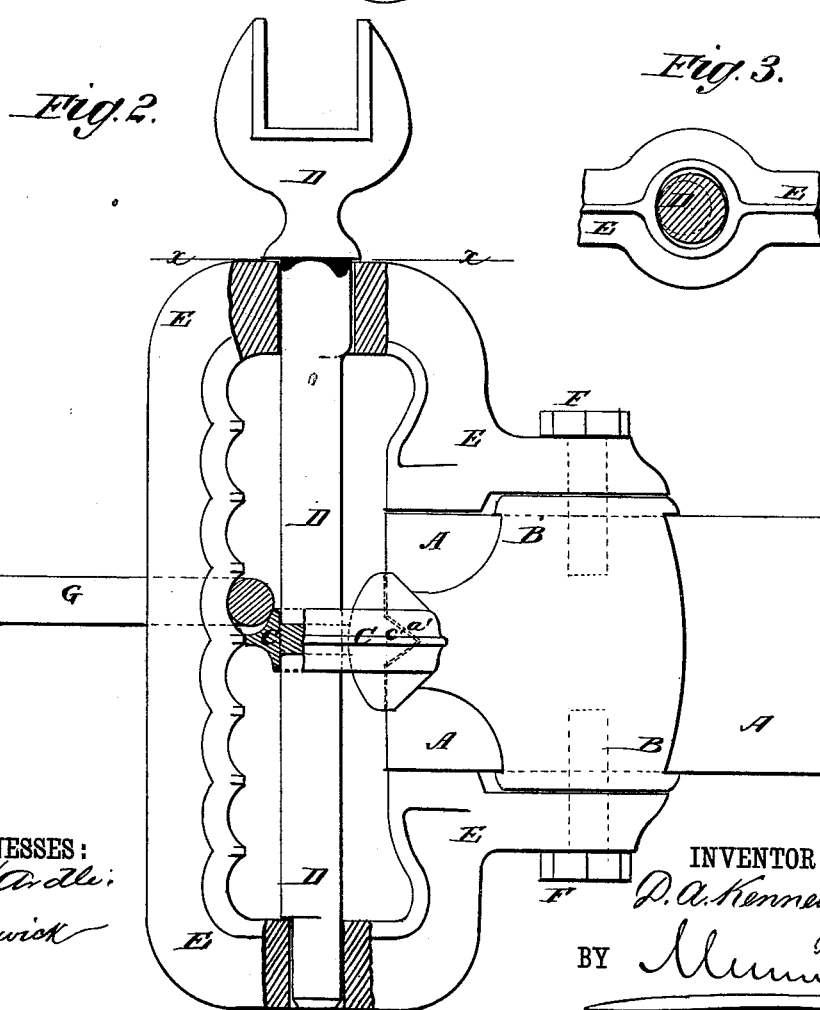
Figure 3:
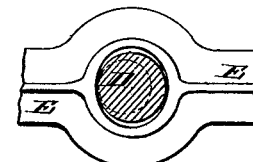

Be it known that I, DONALD A. KENNEDY, of Eau Claire, in the county of Eau Claire and State of Wisconsin, have invented a new and Improved Plow-Clevis, of which the following is a specification:

Figure 1 is a top view of my improved clevis. Fig. 2 is a side view of the same, parts being broken away to show the construction. Fig. 3 is a detail section taken through the line $x\ x$, Fig. 2.

Similar letters of reference indicate corresponding parts.

The object of this invention is to furnish an improved plow-clevis which shall be so constructed that it may be easily and quickly adjusted to cause the plow to take or leave land, and to run deeper or shallower in the ground, as may be desired, and which shall be simple in construction, strong and durable, and not liable to get out of place when in use.

The invention consists in an improved plow-clevis formed by the combination of the sleeve, the horizontal clevis, the vertical clevis, and the eccentric bolt or pin with each other, as hereinafter fully described.

A represents a plow-beam, upon the forward end of which is placed a sleeve, B. C is a horizontal clevis, the arms of which are formed in one piece with the sleeve B, and the bend of which is extended into a curved cross-head, with seven (more or less) holes through it, to receive the locking-bolt D, which holes are made larger than the said bolt, for the purpose hereinafter set forth. In the inner side of the clevis C is formed a V-shaped projection, $c'$, which fits into a V-shaped notch, $a'$, in the forward end of the beam A, to further support the said clevis C in place.

E is the vertical clevis, the arms of which rest upon the upper and lower ends of the sleeve B, and are secured to them and to the plow-beam A by set-screws F, which also serve as pivots to the clevis E. If desired, the set-screws F may be replaced by a bolt passing through the ends of the clevis E, the ends of the sleeve B, and the beam A. The bend of the clevis E is extended upward and downward, and in its inner edge is formed a number of notches to receive the link G, to which the draft is applied.

The locking bolt or pin D is made with a wrench upon its upper end, and with offsets upon the parts that pass through the arms of the clevis E, so that, by turning it into one position, it will come so near the inner edge of the bend of the said clevis E that the link G cannot be moved from one to another of the notches in said edge, and thus cannot get out of place. When the eccentric bolt or pin D is in this position its forward side bears against the clevis C at the forward side of the hole through which it passes, so as to keep it in position, and at the same time distribute the draft-strain through all parts of the clevis.

If desired, the sleeve B and the clevis C may be made in two parts, secured to each other and to the beam A by a bolt passing through them and through the said beam.

In the case of large plows the arms of the clevises C and E may be made longer, so that the sleeve B may be placed farther back upon the beam A. In this case another bolt may be passed through the arms of the clevis C near the forward end of the beam A.

With this construction, by moving the bolt or pin D from one hole to another of the holes of the clevis C, the plow may be adjusted to take or leave land, as may be required, and by turning the eccentric bolt or pin D the link G may be raised or lowered to cause the plow to work deeper or shallower in the ground, as may be required.

Having thus fully described my invention, I claim as new and desire to secure by Letters Patent—

An improved plow-clevis formed by the combination of the sleeve B, the horizontal clevis C, the vertical clevis E, and the eccentric bolt or pin D with each other, substantially as herein shown and described.

DONALD ALEXANDER KENNEDY.

Witnesses:
   JOSEPH MILLS,
   DWIGHT CARD.